United States Patent [19]
Pan et al.

[11] Patent Number: 5,993,917
[45] Date of Patent: *Nov. 30, 1999

[54] METHOD AND APPARATUS FOR IMPROVING WETTABILITY OF FOAM

[75] Inventors: Alfred I-Tsung Pan, Sunnyvale, Calif.; Harold Lee Van Nice, Corvallis, Oreg.

[73] Assignee: Hewlett-Packard Co., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/666,175

[22] Filed: Jun. 19, 1996

[51] Int. Cl.$^6$ .............................. B05D 3/06; B05D 3/14; H05H 1/24
[52] U.S. Cl. ..................... 427/536; 427/534; 427/539; 427/491; 427/569; 427/244
[58] Field of Search ..................... 427/491, 534, 427/536, 538, 569, 570, 573, 571, 572, 575, 243, 244; 216/27, 56, 67

[56] References Cited

U.S. PATENT DOCUMENTS

| | | | |
|---|---|---|---|
| 3,892,573 | 7/1975 | Tatsuta et al. | 427/536 |
| 4,576,859 | 3/1986 | Oyachi et al. | 427/443.1 |
| 4,808,558 | 2/1989 | Park et al. | 501/80 |
| 4,885,935 | 12/1989 | Heffernan et al. | 73/53 |
| 5,013,601 | 5/1991 | Bothe et al. | 427/570 |
| 5,026,463 | 6/1991 | Dinter et al. | 427/536 |
| 5,200,172 | 4/1993 | Kamen et al. | 424/64 |
| 5,229,163 | 7/1993 | Fox | 427/539 |
| 5,286,428 | 2/1994 | Hayashi et al. | 264/45.3 |
| 5,422,377 | 6/1995 | Aubert | 521/64 |
| 5,447,756 | 9/1995 | Kamen | 427/489 |
| 5,467,117 | 11/1995 | Evans et al. | 347/87 |
| 5,618,853 | 4/1997 | Vonken et al. | 521/60 |

OTHER PUBLICATIONS

*Physical Chemistry,* Walter J. Moore, Prentice–Hall Chemistry Series, Second Edition, 1955, pp. 68–97, excerpts.
*Techniques And Applications Of Plasma Chemistry,* (John R. Hollahan, et al, editors) Wiley–Interscience Publication, 1974 pp. 113–147, excerpts, no month.
"Attachment Of Amino Groups To Polymer Surfaces By Radiofrequency Plasmas," J. R. Hollahan and B. B. Stafford, *Journal Of Applied Polymer Science,* vol. 13. pp. 807–816, 1969, no month.
*Fundamentals Of Plasma Chemistry And Technology,* Herman V. Boenig, PhD., Technomic Publishing Company, 1988 pp. 283–291 excerpt, no month.
*Cold Plasma In Materials Fabrication, From Fundamentals To Applications,* Alfred Grill, The Institute Of Electrical And Electronics Engineers, Inc. 1993 pp. 151–161 excerpts, no month.

Primary Examiner—Marianne Padgett
Attorney, Agent, or Firm—Kevin B. Sullivan

[57] ABSTRACT

The present invention is a method of treating foam for improving wettability. The method includes treating foam with reactive species which interact to produce reaction products. The reaction products are then removed from foam. Finally, after removing reaction products the foam is treated with reactive species which interact to produce additional reaction products.

15 Claims, 8 Drawing Sheets

METHOD AND APPARATUS FOR IMPROVING WETTABILITY OF FOAM

BACKGROUND OF THE INVENTION

The present invention relates to open cell foam used as ink reservoirs in ink printing pens. More specifically, the present invention relates to a method and apparatus whereby pressure is varied between plasma treatment cycles to produce an outdiffusion of reaction products from the foam. This outdiffusion together with the indiffusion of reactants into the foam to provides more uniform surface treatment throughout the interior surfaces of the foam thereby increasing foam bulk wettability characteristics.

Ink jet printers employ ink reservoirs to supply a printhead with ink. An ink reservoir consists of foam housed within a pen cartridge, the foam having been permeated with ink. The foam absorbs and retains the ink, thereby enabling a printer to control the rate at which ink flows to the printhead.

The process of ink jet printing requires that a continual supply of ink be available to the printhead. In thermal ink jet printers, the printhead comprises a plurality of tiny nozzles formed in a nozzle plate. Underneath each nozzle is a firing chamber which is commonly feed with ink from a plenum connected to the ink reservoir. A microprocessor in the printer provides a signal that directs the expulsion of ink through a nozzle so that the ink forms a droplet. The trajectory of the droplet is such that the droplet strikes the paper at a precise target. The precision required in ink jet printing makes the ink reservoir's ability to efficiently, reliably, and predictably supply ink to the printhead nozzles critical.

Therefore, the foam within the ink reservoir must effectively retain ink to prevent unintentional seepage of the ink out of the printhead nozzles. This unintentional seepage of ink from the cartridge is sometimes referred to as "drool" which, in the case of multi-color printing, can result in inadvertent color mixing if ink emanating from a nozzle associated with one color is pulled into a nozzle associated with another color. This inadvertent color mixing results in a reduction of the output image quality. Additionally, the foam must supply ink as required by the printhead. Lastly, the foam must accomplish these goals without adversely effecting the quality of the ink.

As manufactured, most organic polymer based foam is unable to meet these goals. Untreated polyurethane foam is hydrophobic and therefore does not readily absorb aqueous based inks. One method used to prepare foam to serve as an ink reservoir involves prewetting the foam prior to loading it with ink. Prewetting the foam reduces its hydrophobicity so that the foam absorbs rather than repels the ink. A method for prewetting foam is discussed in U.S. Pat. No. 5,467,117 entitled "Addition Of Alcohol To Prewet Solutions To Enhance And Accelerate Wetting To Hydrophobic Foams For Application To Ink Jet Pens" to Evans et al assigned to the assignee of the present invention and incorporated herein by reference.

Plasmas have been used to modify the surface structure of polymer solids as discussed in "Techniques and Applications of Plasma Chemistry", edited by John R. Hollahan and Alexis Bell, published by John Wiley and Sons, 1974. These surface modifications brought about by exposure to a plasma include changes to the surface wettability, molecular weight of a surface layer and the chemical composition of the surface. However, as pointed out by Hollahan the effects of the plasma treatment are confined to the surface layer and therefore the bulk properties of the material remain unchanged. (See page 117).

U.S. Pat. No. 5,447,756 entitled "Method Of Forning Surface Treated Applicators" to Kamen discloses a method whereby a plasma surface treatment of cosmetic applicators such as mascara brushes, makeup brushes and sponge like applicators to improve the hold, wettability, pickup, laydown, release, and application. The plasma treatment process is described as a grafting process whereby a substrate layer is grafted to the cosmetic applicator surface. The cosmetic applicator is used to apply paint, powder, make-up or nail enamel to a surface.

Reticulated or open cell foam has some very unusual attributes which make it not well suited to the plasma treatment techniques previously used for improving wettability. For example, open cell foam has an interior which is a dense matrix structure with confined passages deep within the foam. The surface area of the foam is therefore very large for a given unit mass. Frequently, the foam used in ink storage applications is compressed using thermal compression techniques such as felting. Highly felted foam tends to have a structure that is more dense and more confined than unfelted foam which further adds to the problem of treating surfaces deep within the foam matrix.

Previously used surface treatment techniques are not well suited for treating foam which has confined passages deep within the foam. One problem associated with plasma treatment of foam is that there is limited radical generation inside of the foam. Radicals are generated mainly by collision processes with electrons, ions, or other species. The confined passages within the foam provide a smaller mean free path than the mean free path required to form radicals. The very small mean free path makes it much more likely the electrons, ions and other species will collide with a foam surface near the periphery of the foam than deep inside the interior of the foam. Therefore, within the foam matrix there are few of these excited elements from which to form radicals.

Another problem associated with plasma treatment of foam is that there is little diffusion of radicals into the foam. Since the mean free path of radicals is larger than the foam passage dimensions, radicals rarely reach the interior of the foam without first colliding with, and gettered by the peripheral surfaces of the foam 12. Finally, there is little diffusion of reaction products out of the foam. This limited outdiffusion of reaction products from the foam 12 results in higher concentrations of reaction products which slow the reaction rate of radicals within the foam 12. Therefore, conventional plasma treatment of foam treats only surfaces along the periphery of the foam and provides little improvement to wettability characteristics of interior surfaces of the foam matrix.

There is a continuing need for improved methods for improving the wettability characteristics of the foam interior surfaces. This treatment should be capable of treating not only the surfaces near the periphery of the foam but also surfaces deep within the dense matrix of the foam. This treatment should increase the wettability throughout the interior surfaces or foam bulk to prevent areas of increased capillary or capillary gradient which can result in the stranding of ink within the foam. Finally, this treatment should be cost effective to reduce the overall manufacturing costs of the ink cartridge.

SUMMARY OF THE INVENTION

The present invention is a method of treating open cell foam for improving wettability. The method includes treating the foam with a reactive specie which interacts to produce a reaction product. The reaction product is then removed from the foam. After removing the reaction product the foam is again treated with a reactive specie which interacts to produce a reaction product. In one preferred embodiment the foam is a polyurethane foam and the treatment with a reactive specie is a free radical oxidation of the polyurethane foam using a gas plasma treatment process. In this preferred embodiment the plasma treatment process is carried out using oxygen gas at a first pressure and removing reaction products is accomplished at a second pressure less than a first pressure.

Another aspect of the present method for improving coverage of a chemically active surface treatment for foam. The method includes diffusing chemically active species into the foam using a pressure differential. The chemically active species react with the foam to produce reaction products. In a preferred embodiment the foam is a polyurethane foam and the diffuising of chemically active species into the polyurethane foam is performed by changing pressure is a region surrounding the polyurethane foam to produce difffusion of chemically active species into the polyurethane foam. In this preferred embodiment the chemically active species are free radicals.

Another aspect of the present invention is a method of treating polyurethane foam for improving wettability. The method includes cleaning the polyurethane foam to remove contaminants and treating the polyurethane foam using a gas plasma treatment process.

DETAILED DESCRIPTION OF THE PREFERRED EMBODIMENT

Figure 1:
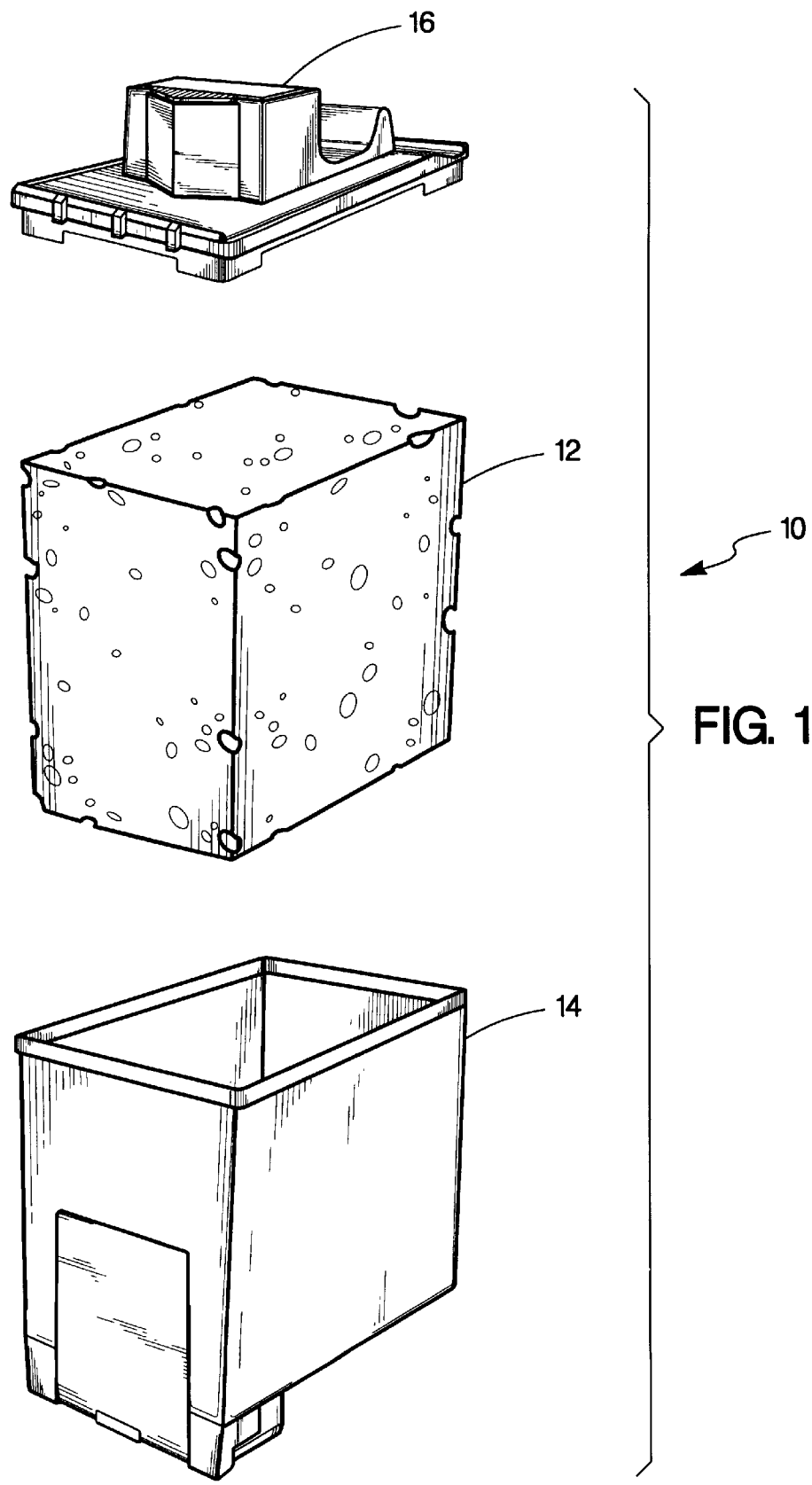
FIG. 1 is an exploded view, in perspective, depicting the components of the pen body before assembly.

FIG. 1 shows an ink cartridge 10 which includes hydrophobic foam 12, a pen or cartridge body 14, and a cap 16. The hydrophobic foam 12 is preferably formed from a polymer material such as polyurethane. The foam 12 is a reticulated or open cell foam which forms a dense matrix structure having very confined passages extending deep into the foam 12.

The foam 12 is inserted into the pen body 14 and the cap 16 is then placed on the pen body to seal the pen body to prevent ink from escaping. The foam 12 is usually compressed to provide capilary pressure within the foam 12 preventing ink from stranding within the foam. The pen body 14 includes a printhead having a plurality of nozzles for ejecting ink onto print media. A single color ink cartridge is shown in FIG. 1 for simplicity. Frequently the ink cartridge 10 includes more than one chamber with each chamber associated with a different color ink. In the case of a multi-chamber pen, a separate foam member 12 is required for each chamber.

Foam 12, in addition to storing ink, provides backpressure which prevents ink from inadvertently leaking from the printhead. If the backpressure is not sufficient then environmental changes such as changes in atmospheric pressure, temperature or mechanical shock can produce inadvertent ink leakage from the printhead. Inadvertent ink leakage from the printhead can reduce the quality of the output image. In addition, in the case of color printing, inadvertent ink leakage from nozzles associated with one color can be ingested by nozzles associated with another color thereby producing inadvertent color mixing which also reduces the quality of the output image.

The present invention is a method for treating foam 12 for increasing the wettability of foam surfaces deep within the foam structure to improve bulk wettability characteristics of the foam 12. The wettability of foam surfaces deep within the foam matrix are increased as well as wettability of foam surfaces near the periphery of the foam 12. By treating foam surfaces throughout the foam bulk greater and more consistent back pressure can be provided by the foam 12 for reducing or eliminating inadvertent ink leakage from the printhead. In addition, the wettability of the foam is more consistent throughout the bulk of the foam 12. Non-uniform wettability can result in capillary gradient which can produce ink stranding within the foam 12.

Before discussing the method of the present invention for improving wettability of foam 12 it will be helpful to first define wettability. Wettability, as defined herein, is the ability of a standard configuration of foam 12 to absorb a mass of ink or for the ink to rise to a given height in a standard piece of foam 12. Therefore, to increase the wettability of the foam is to increase the ability of a standard configuration of foam to absorb a larger mass of ink or for the ink to rise higher in a standard piece of foam. Capillary rise of ink in foam can be represented by the following equation:

$$\rho gh = [2\sigma \cos\Theta_e]/r_e = P_c \qquad \text{Equation 1}$$

where $\rho$ is the density of the ink, g is the gravitational constant, h is the height the ink has risen above the liquid in a container in which the foam is standing. The symbol $\sigma$ represents the surface tension of the liquid, $\theta_e$ is the effective equilibrium wetting angle of the liquid on the surface of the foam, $r_e$ is the effective pore radius of the foam and $P_c$ represents the capillary pressure. It can be seen from equation 1 that a reduction of the wetting angle of the ink on the foam will improve or increase the height that the ink rises in the foam, assuming all other parameters remain the same. The method of the present invention is directed to a method for increasing the surface energy of surfaces throughout the foam for reducing the wetting angle of the foam thereby increasing the height the ink rises or the wettability of the foam.

Figure 2:
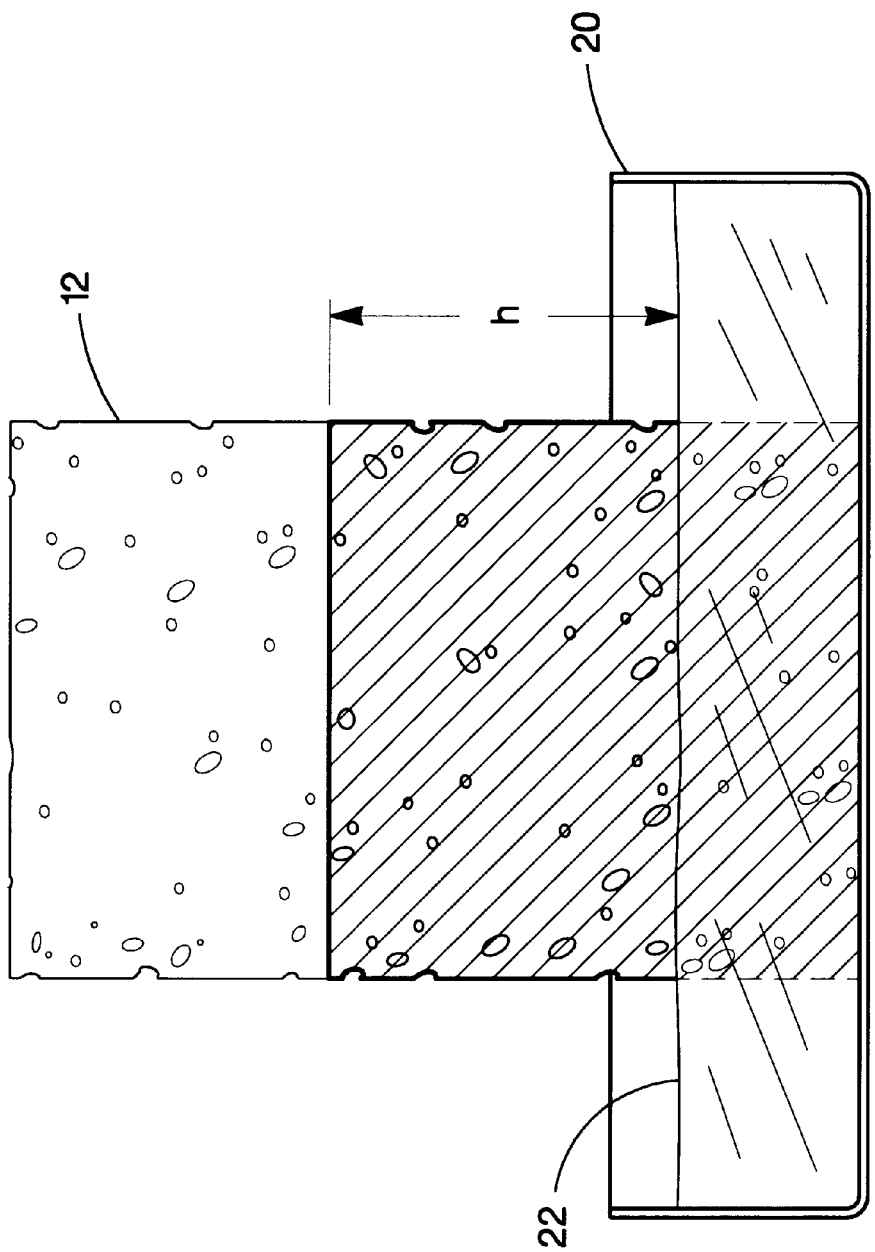
FIG. 2 is a schematic representation of the capillary rise technique used to measure ink height.

FIG. 2 shows a schematic representation of the capillary rise technique used to measure the ink height in foam 12. This technique makes use of a container 20 that is filled with ink 22. Foam 12 is inserted into the container 20 whereupon the height of capillary rise of the ink is represented by variable h is measured. This technique is effective in measuring the relative wettabilities of identical foam samples which are treated by different processes. This technique does not require the determination of the effective equilibrium wetting angle ($\theta_e$) or the effective pore radius ($r_e$), each of which are difficult to measure experimentally.

Measurement of the ink height in foam 12 is difficult to accurately measure because the ink rises higher on the outer peripheral portion of the foam 12 than the interior of the foam. This differential in ink height results from differences in wettability between the inner portion of the foam 12 and the outer peripheral portions of the foam 12. A technique for determining the wettability of foam 12 samples processed by different treatment techniques is to measure the mass of ink absorbed by the foam 12. The mass of the ink absorbed by the foam 12 is related to the density of the ink. Because the density of the ink is related to the capillary rise by equation 1 then the mass of the ink absorbed is related to the capillary rise, assuming that the ink rises uniformly in the foam 12. In the case of non-uniform wettabillty the ink is distributed throughout the volume according to wettability.

Figure 3:
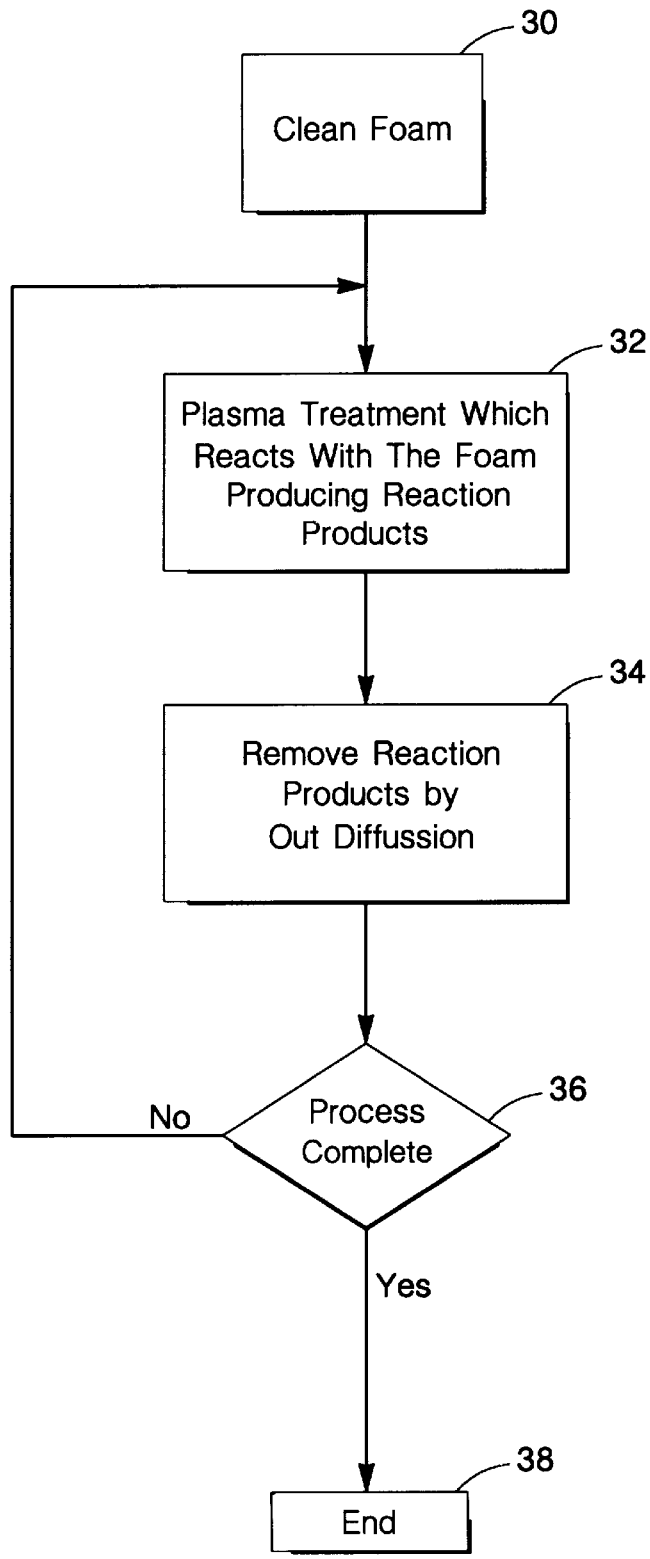
FIG. 3 illustrates the method of the present invention for treating foam to increase wettability.

FIG. 3 represents the method of the present invention for treating foam 12 to improve bulk wettability characteristics. A cleaning process is used as represented by step 30 to remove contaminates from the foam 12. These contaminates may include various mobile materials such as oil which remain on the surface of the foam as a result of the manufacturing process used to form the foam 12. The cleaning process will be discussed in more detail later.

The foam 12 is treated using a plasma treatment to react with foam surfaces as represented by step 32. The plasma treatment improves wettability of the foam by incorporating oxygen and non-oxygen-containing functional groups which attach to the surface of the polymeric material of the foam. These functional groups include carbonyl (—C=O), hydroperoxide (—OOH), hydroxyl (—OH), or carboxyl (—COOH). It is these functional groups which increase the surface energy of the foam thereby reducing the wetting angle of the ink on the foam. The process of plasma treating polymer surfaces is discussed in more detail in Hollahan pp. 113–145.

Reaction products from the plasma treatment are removed from the foam 12 using a diffusion process as represented by step 34. Applicants have recognized that previously used plasma treated techniques are not well suited for altering the interior matrix properties of foam 12 because the reaction is limited by radical generation inside the foam 12, diffusion of radicals into the foam 12 and limited diffusion of reaction products out of the foam 12. Each of the reaction limiting events are related to the presence of confined passages in the foam which limit the ingress and egress of electrons, ions, radicals, and other excited species into the foam as well as a diffusion of reaction products such as hydrogenoxides, carbon dioxides, and water from difffusing out of the foam 12. Because of these reaction limiting events the plasma surface treatment of a dense foam matrix tends to result in treatment of only outer peripheral surface portions of the foam 12.

It is the process of removing reaction products in step 34 of the present invention which allows the plasma treatment of step 32 to treat surfaces deep within the dense matrix of the foam 12. The limited outdifffusion of reaction products from deep within the foam 12 produces increased concentrations of these reaction products which reduce the diffusion of radicals into the foam 12 as well as reduce the concentration of radicals, both of which tend to reduce the reaction rate of radicals within the foam 12. In the preferred embodiment reaction products are removed by pressurizing with a gas such as oxygen which produces an indiffusion of oxygen into the foam 12 diluting the reaction products. The pressure is then reduced which tends to produce an outdiffusion of the diluted reaction products from the foam 12.

It is preferable that the plasma treatment, step 32 and the removal of reaction product, step 34 be performed several times as represented by the decision, step 36. By performing the plasma treatment, step 32 and the removal of reaction product, step 34 several times the reactive species such as ions, electrons, metastables, atoms, free-radicals, and protons can diffuse deeper into the foam 12 thereby treating a greater portion of the foam surface deep within the foam bulk. After all the cycles of plasma treatment 32 and the removal of reaction products 34 are complete the process of the present invention is completed as represented by step 38. In the preferred embodiment each cycle which includes steps 32 and 34 are performed in a range of 2 to 5 cycles before the process is complete in step 36.

Figure 4:
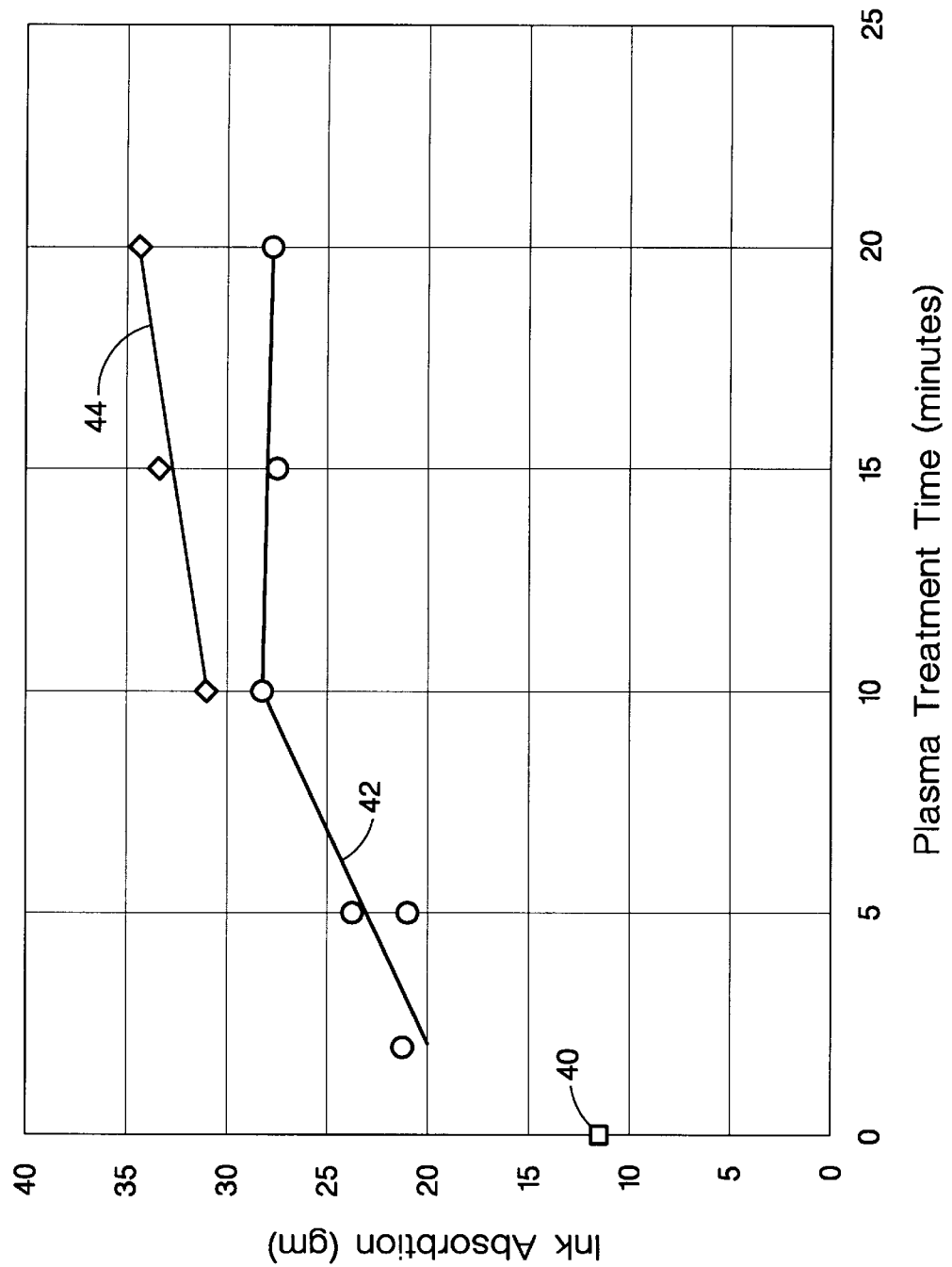
FIG. 4 represents the relationship between ink absorption measured and plasma treatment time for untreated foam, plasma treated foam and foam treated using the method of the present invention for increasing foam wettability.

FIG. 4 shows a comparison of the results for experiments performed which illustrate the ink absorption versus the plasma treatment time for the plasma treatment alone and plasma treatment together with the removal of reaction products. The effectiveness of the plasma treatment in improving the bulk wettability characteristics of the foam 12 is measured by the mass of the ink absorbed by the foam. Data point 40 in FIG. 4 represents the ink absorption of untreated foam. Curve 42 represents the treatment of foam 12 with oxygen plasma at a 150 watts power at 400 millitorr pressure for a series of treatment times. It can be seen from curve 42 that the depth of plasma treatment increases with the increasing time up to about 10 minutes. Plasma treatment times greater than 10 minutes exhibit little or no improvement in ink absorption.

The mass of ink absorbed by the foam 12 is determined by placing the foam 12 in a petri dish filled with ink for 3 minutes. The amount of ink absorbed is the weight of the soaked foam minus the weight of the dry foam.

Curve 44 represents the improved plasma treatment process of the present invention, which makes use of the removal of reaction products represented by step 34 in FIG. 3. Curve 44 represents multiple plasma treatments of 5 minutes each. In between plasma treatments the plasma is shut off and the chamber is reduced to a base pressure of 50 millitorr and then repressurized to a pressure greater than 2 torr with oxygen. The next plasma treatment includes reducing the chamber pressure to 400 millitorr and treating the foam for 5 minutes at 150 watts of power. It is the pressurization to greater than 2 torr which produces an indiffusion of oxygen into the foam 12 which dilutes the reaction products. The subsequent reduction of the chamber pressure to 400 millitorr to begin the next plasma treatment causes an outdiffusion of reaction products. It is the removal of reaction products within the foam 12 from the previous plasma treatment which improves the effectiveness of the allows the subsequent plasma treatment. The removal of reaction products improves the ability of free radicals to diffuse into the foam and thereby increase the wettability of foam surfaces deep within the foam structure.

The experiments, unless otherwise noted, were performed using a Reactive Ion Etch (RIE) type system manufactured by Technics Planar Etch Model IIA. The Technics system is a parallel plate type reactor. Parallel plate type reactors produce reactive species between these plates. The foam 12 to be treated is positioned between the parallel plates.

Figure 5:
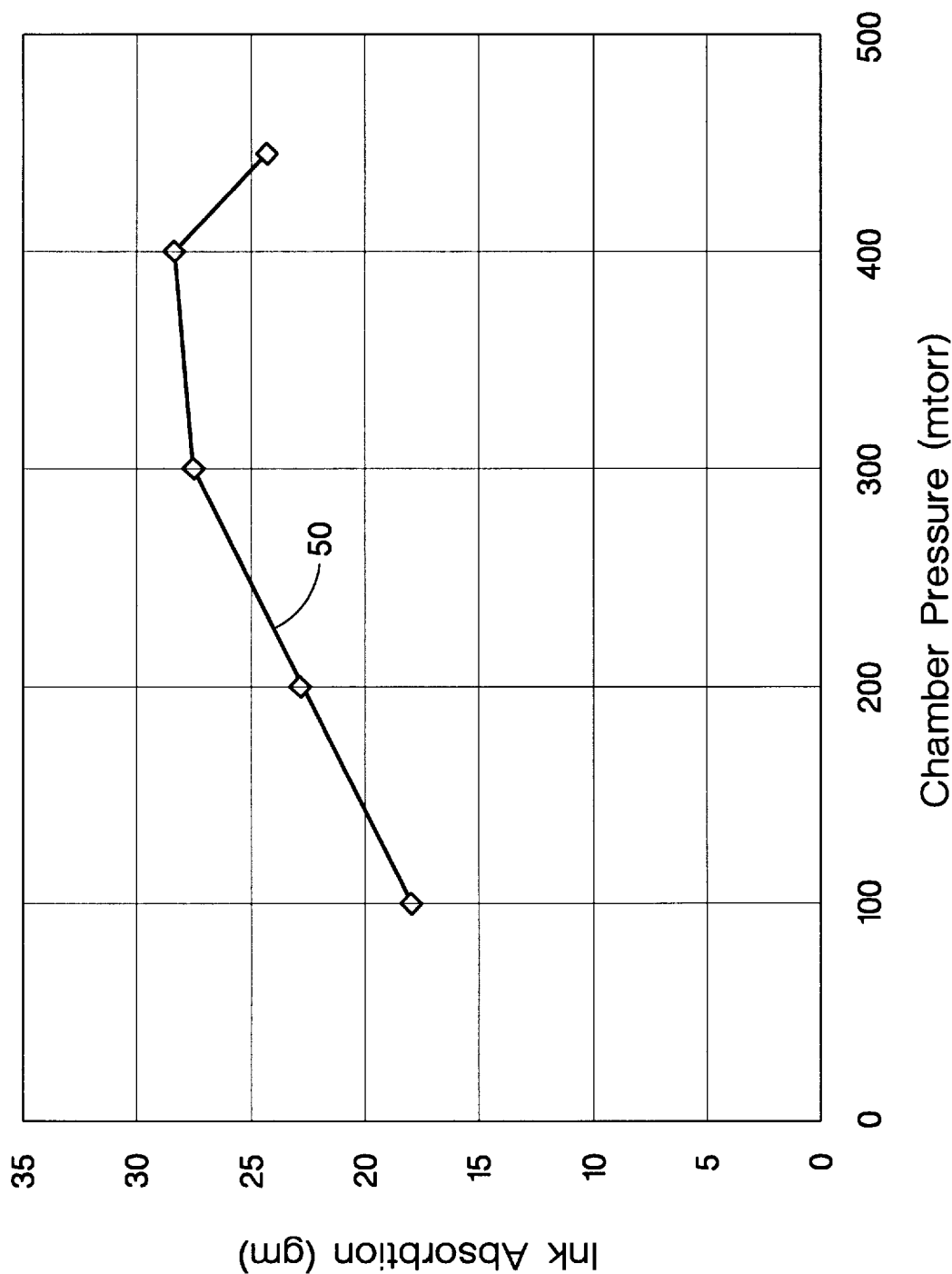
FIG. 5 represents the relationship between ink absorption and plasma treatment chamber pressure.

FIG. 5 shows the ink absorption verses the chamber pressure to illustrate the effect of plasma pressure on wettability of the foam 12. A curve 50 represents the treatment of foam 12 with oxygen plasma at 150 watts power for 10 minutes at various chamber pressures. It can be seen from FIG. 5 that the optimum chamber pressure is approximately 400 millitorr. However, a range of plasma treatment pressures from 300 millitorr and 400 millitorr appear to be satisfactory.

Figure 6:
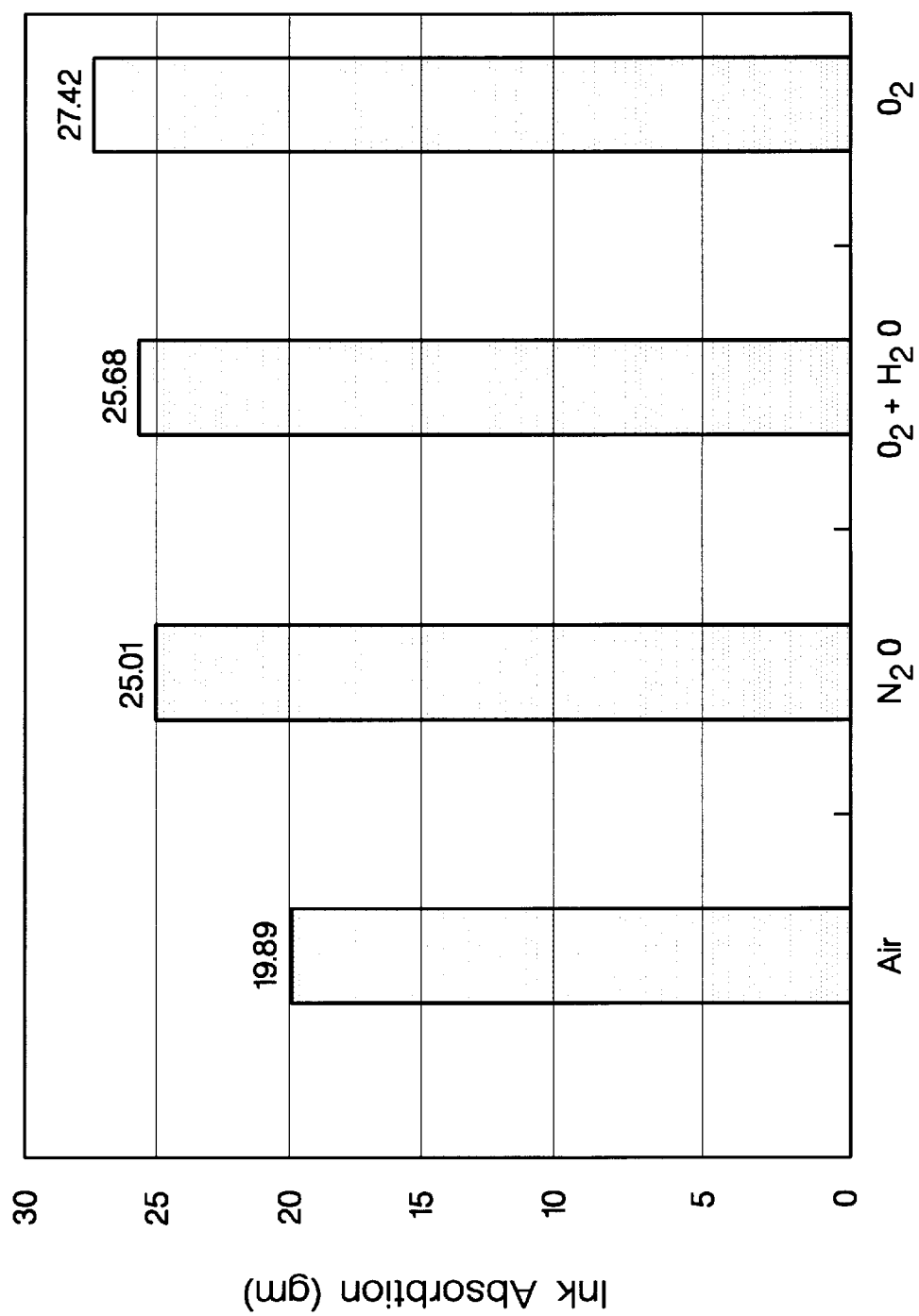
FIG. 6 represents the ink absorption resulting from plasma treatment using various reaction gasses.

FIG. 6 is a representation of the effect of plasma chemistry on ink absorption. Foam is treated at 150 watts power, at 300 millitorr pressure for 10 minutes. The following gas plasma were evaluated individually: oxygen ($O_2$), oxygen plus water ($O_2+H_2O$), air, and nitrous oxide ($N_2O$). The water is supplied from the evaporation of deionized water inside a beaker. The results of using the different gasses for plasma treatment on the ink absorption of foam are illustrated in the form of a bar graph shown in FIG. 6. The oxygen plasma treatment appears to provide the highest ink absorption.

Figure 7:
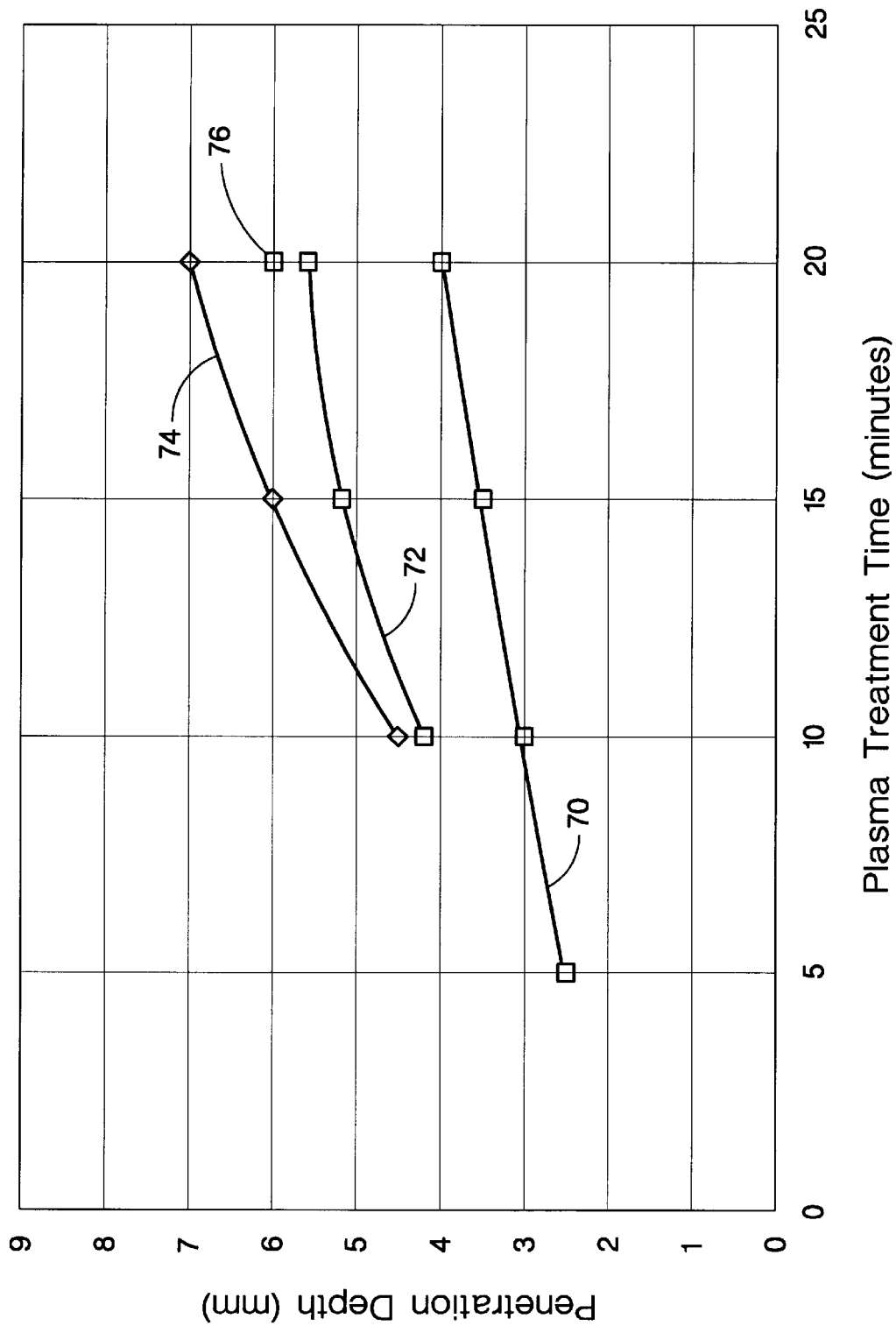
FIG. 7 represents the relationship between ink penetration depth and plasma treatment time for foam samples having a single plasma treatment and foam having multiple plasma treatments.

FIG. 7 shows the effect of multiple cycles on plasma treatment. FIG. 7 shows the penetration depth verses plasma treatment time. The penetration depth represents a measured depth of vehicle absortion into the foam after plasma treatment. The vehicle is similar to the ink composition except that the vehicle does not contain dye. Curve 70 represents the penetration depth for four different foam samples each having a different plasma treatment time. The penetration depth is related to the height of vehicle absorption into the interior of the foam 12 and therefore related to the overall mass increase of the foam. The plasma treatment time for curve 70 are for a single plasma treatment for each of the samples. For example, one sample was treated with one plasma treatment of a five minute duration, another sample was treated for ten minutes, a third sample was treated for 15 minutes, and a fourth sample was treated for a duration of 20 minutes.

Curve 72 represents foam samples which were treated with multiple cycles with each cycle including pumping to a base pressure, repressurized to a plasma process pressure, plasma processing for a five minute duration, repressurizing to a higher unknown pressure then pumping to the base pressure. Therefore, a data point representing a plasma treatment time of 10 minutes in duration is accomplished by performing two complete plasma treatment cycles. For the data points representing 15 and 20 minutes then three and four plasma treatment cycles are performed, respectively, for each of the different foam samples.

Curve 74 represents the treatment of foam samples with multiple cycles similar to those of curve 72 except that each cycle includes soaking at a base pressure for several minutes prior to repressurizing to the plasma pressure. Therefore, each plasma treatment cycle for the foam samples represented by curve 74 includes pumping to a base pressure, holding at a base pressure for several minutes, repressurizing to plasma pressure, treatment with plasma for five minutes duration, repressurizing to an unknown higher pressure. This entire cycle is performed twice for the foam sample which represents ten minutes of plasma treatment, three times for the foam sample representing 15 minutes of plasma treatment time and four times for the foam sample representing plasma treatment time of 20 minutes.

Data point 76 represents the treatment of foam samples for four plasma treatment cycles of pumping to a base pressure, repressurizing to a plasma treatment pressure, plasma treatment for five minutes duration, repressurizing to atmospheric pressure, pumping to a base pressure and repeating the entire cycle four times. It can be seen from FIG. 7 that multiple cycles of plasma treatment and pressure cycling provides increased penetration of the plasma treatment deep into the foam matrix. The previously discussed experiments were performed using the Technics RIE system.

An investigation was then made to determine the effect of pumping to a 50 millitorr base pressure on the absorption qualities of the foam. This investigation was performed using an Airco Hammer II plasma system. As discussed previously between plasma treatment cycles the chamber was pumped to a 50 millitorr base pressure and repressurized to the plasma processing pressure of 400 millitorr. To determine if reducing the chamber pressure to a 50 millitorr base pressure prior to plasma treatment is critical to improving the wettability of foam. An experiment was conducted to investigate the effects of wettability for samples processed using a 50 millitorr base pressure and another set of samples using a 300 millitorr base pressure. The samples for both base pressures were processed for five plasma treatment cycles using air to repressurize to 200 torr for each cycle. The results are shown in table 1 below.

TABLE 1

| Effect of Pumping to 50 mtorr Each Cycle | | |
| --- | --- | --- |
| Process type: | 50 mtorr base pressure | 300 mtorr base pressure |
| Vehicle Absorbed: | 28.9 grams | 29.9 grams |
| Number of Samples | 3 | 3 |

Based on these experimental results it appears there is very little difference in the mass of the vehicle absorbed between the 50 millitorr base pressure and the 300 millitorr base pressure. One can conclude that the gaseous reaction products from plasma processing are effectively removed from the foam 12 in reducing the chamber pressure between plasma treatment cycles from 200 torr to 300 mlllitorr. This is significant because pumping to the much lower base pressure of 50 millitorr adds significantly to the overall process time. This experiment was performed using an Airco Hammer II plasma system.

An experiment was then performed to determine the effect of repressurizing using air or oxygen on the overall wettability of foam 12. As discussed previously, between plasma treatment cycles the chamber is repressurized to 200 torr to indiffuse air or oxygen deep into the inner portions of the foam matrix. This experiment was conducted to determine whether oxygen or air is more effective in improving the wettability of foam 12 using multiple plasma treatment cycles. This experiment was conducted using a 300 millitorr base pressure. The chamber was repressurized with air for one set of samples and oxygen for another set of samples to a pressure of 200 torr. Both sets of samples were treated for five treatment cycles. The results of this experiment are shown in table 2 shown below. It can be seen from Table 2 that the mass of vehicle absorbed for the wettability of the foam 12 is significantly improved when the chamber is repressurized using oxygen. This experiment was performed using an Airco Hammer II plasma system.

TABLE 2

| Effect of Repressurizing to 200 torr Using Air Or Oxygen | | |
| --- | --- | --- |
| Process type: | Air | Oxygen |
| Vehicle Absorbed: | 26.7 grams | 33.3 grams |
| Number of Samples | 4 | 4 |

An experiment was then performed to determine the effect of plasma treatment pressure on the wettability of foam 12. This experiment was an attempt to determine the plasma treatment pressure necessary to treat the interior of the foam 12. The first step in this experiment was to investigate pressure variation during the plasma treatment process. The plasma treatment chamber pressure was varied over a range of 400 millitorr to 700 millitorr while plasma was applied. The result of this experiment indicates there was no significant improvement in the absorption of the foam 12. This experiment was performed using an Airco Hammer II plasma system.

The second step of this experiment was to repressurize the chamber to five torr for five treatment cycles. The repressurization to five torr did not show a significant improvement in the absorption or wettability of the foam 12.

Next, a series of experiments were then performed using the Hammer II plasma system to determine the optimum repressurization pressure. Between plasma treatment cycles the chamber was repressurized to 50 torr using oxygen for one set of samples and repressurized to 100 torr using oxygen for a second set of sample. These experiments are summarized in Table 3 shown below. The results were compared to the previous experiment whereby the chamber was repressurized using oxygen to 200 torr between plasma treatment cycles, as shown in Table 2. It can be seen from Table 3 that repressurizing to a range of 100 to 200 torr with oxygen is adequate for removing reaction products and thereby increasing wettability and absorption of the foam 12.

TABLE 3

Effect of Repressurizing Pressure

| Process type: | 50 torr | 100 torr | 200 torr |
| --- | --- | --- | --- |
| Vehicle Absorbed: | 30.5 grams | 33.2 grams | 33.3 grams |
| Number of Samples | 3 | 3 | 4 |

To minimize the process time it is desirable to repressurize to the lowest effective pressure. This reduces the pressurization time as well as the pumping time required in reducing the pressure down to the plasma treatment pressure as required in the next plasma treatment cycle. An experiment was performed to determine if significantly increasing the repressurization pressure between plasma treatment cycles improves wettability of the foam 12. Between plasma treatment cycles the chamber pressure was pressurized to 1 atmosphere or 760 torr using oxygen. The result was that significantly increasing the repressurization pressure did not improve significantly the wettability or absorption of the foam 12 and significantly increased the processing time. Therefore, repressurizing the chamber to 200 torr using oxygen provides adequate purging of reaction products to improve the wettability of foam 12 while not overly increasing the processing time.

An experiment was then performed using the Hammer II plasma system to determine the effect cleaning foam 12 prior to plasma treatment has on the foam wettability properties. A cleaning solvent of 2-propanol (Isopropyl Alcohol, IPA) and 1, 1, 1-Trichloroethylene was used. The foam 12 was dried in an oven at 105° C. for 12 hours prior to plasma treatment. The plasma treatment cycle included reducing the chamber pressure to a base pressure of 300 millitorr, repressurizing the chamber to 400 millitorr, plasma treating foam 12 for, one minute at 4.5 kilowatts power at a radio frequency of 13.56 megahertz, repressurizing the chamber to 200 torr using oxygen. The plasma treatment cycle is repeated for four more cycles. The experimental data is summarized in Table 4 shown below. It can be seen from Table 4 that the Isopropyl Alcohol cleaning prior to plasma treatment significantly improves the foams absorption of vehicle after the plasma treatment.

TABLE 4

Effect of Cleaning the Foam BEFORE Plasma Treatment

| Process type: | NO Cleaning | IPA Cleaned | Trichloroethylene Cleaned |
| --- | --- | --- | --- |
| Vehicle Absorbed: | 32.6 grams | 37.3 grams | 33.9 grams |
| Number of Samples | 3 | 3 | 3 |

The preferred method of the present invention for treating polymer based foam 12 to improve wettability will now be described. In the preferred embodiment the polymer based foam 12 is polyurethane. The polymer foam 12 is cleaned to remove contaminants within the foam 12 such as oil or low molecular polyurethane. A cleaning solution such as Isopropyl Alcohol is used as a cleaning solvent. Applicants believe that a wide range of cleaning solutions which are suitable for removing oil and low molecular weight materials from the foam 12. These cleaning solutions include organic solvents such as hydrocarbons, ketones, alcohols, ethers, acids, heterocyclic solvents and liquid carbon dioxide. One preferred cleaning solvent which is a terpene and tetrahydrofurftuyl alcohol cleaning agent marketed under the tradename such Synergy CCS by Petroferm Inc., Fermandina Beach, Fla. and described in U.S. Pat. No. 5,514,294. The foam 12 is then dried in-an oven at 105° C. for 12 hours.

The foam 12 is then plasma treated using the Airco Hammer II plasma system.

The Hammer II plasma system is fitted with a Plasma Sciences system controller. The foam 12 is treated as follows:

a) The chamber pressure is reduced from atmospheric pressure to 300 millitorr.

b) The chamber is then repressurized to 400 millitorr using oxygen.

c) The foam 12 is plasma treated at 4.5 kilowatts power at a frequency of 13.56 megahertz. The plasma treatment is for a duration of one minute.

After plasma treatment the following steps are performed four times:

d) The chamber is repressurized to 200 torr using oxygen. Oxygen gasses rapidly admitted, preferably with a large diameter line from a large dewar to reduce process time.

e) The chamber pressure is reduced to a base pressure of 300 millitorr.

f) The chamber pressure is increased to 400 millitorr using oxygen.

g) The foam 12 is plasma treated using a power setting of 4.5 kilowatts power at a frequency of 13.56 megahertz. The plasma treatment is for a duration of one minute.

In the preferred embodiment 5 plasma treatment cycles are performed for foam 12 felted at a felting ratio of 5.5. The improvement of the plasma treatment cycling on wettability of the foam 12 diminishes after 5 cycles and therefore the use of more than 5 cycles provides marginal wettability improvement.

In general, the factors that effect the plasma treatment time and number of plasma treatment cycles include the porosity of the foam 12, the loading of the plasma treatment chamber, the thickness of the foam 12 and density of reactive species. The porosity of the foam 12 is related to felting in that felting reduces the porocity of the foam 12 creating more confined passages within the foam interior. It is the interior surfaces deep within the foam 12 that require a greater number of cycles of plasma treatment and removal of reaction products for an improvement in wettability. Similarly, increasing foam thickness increases the depth of the confined passages within the foam 12. Therefore, an increase in the number of treatment cycles is required to treat surfaces at greater depths within the foam 12. Increasing the amount of foam 12 in the plasma treatment chamber reduces the concentration of reactive species relative to total surface area of foam 12. Therefore, increasing the chamber loading requires increasing the plasma treatment time and or the number of treatment cycles.

An analysis was performed of the treated foam 12 to determine if the mechanism of increased wettability was due to a chemical change of the surface of the foam 12 or a morphological change. X-ray photoelectron spectroscopy, (XPS) or electron spectroscopy for chemical analysis, (ESCA) was performed on the foam 12. The XPS is a surface analysis which analyzes the top few tens of angstroms of a material. The analysis was conducted in a very high vacuum approximately $10^{-9}$ torr by bombarding the surface analyzed with an intense X-ray on the order of 1486.6 electron volts. The foam 12 samples which were analyzed were approximately one centimeter square and one millimeter thick. These samples were cut from larger foam pieces which were 2.1"×2.1"×0.42" and which were felted at a felting ratio of 5.5. The pieces for analysis of the interior of the foam 12 were cut such that the surface analyzed was very close to the center of the large foam sample and thus would measure the amount of plasma treatment occurring in the middle interior of the foam 12. The samples are identified as "interior" in Table 5 shown below. Samples identified as "surface" are from the surface of the larger piece of foam 12. The relevant elements detected in the surface of the sample of foam 12 are oxygen, and carbon. The XPS spectrum contained a carbon $1_{sp}$ photoelectron peak from the plasma treated samples which was noticeably more broad compared to the untreated foam 12. The deconvolution of the carbon $1_{sp}$ peak indicated that the oxygen was probably bound to the carbon as a carbonyl (—C=O). Very light sputtering of the surface to remove absorbed species showed that the elements are indeed chemically bound to the surface of the foam fibers. The atomic concentration of the various elements is calculated and shown in Table 5 below.

TABLE 5

Atomic Concentration of Elements on Polyurethane Foam

| Sample Description | % carbon | % oxygen |
|---|---|---|
| Untreated, surface | 64.7 | 25.8 |
| Untreated, interior | 65.4 | 25.0 |
| PLASMA TREATED: | | |
| 1–10 minute cycle, surface | 57.1 | 32.4 |
| 1–10 minute cycle, interior | 60.2 | 29.6 |
| 5–1 minute cycles, surface | 56.0 | 34.7 |
| 5–1 minute cycles, interior | 61.2 | 29.7 |
| Oxygen cycle, surface | 54.7 | 35.4 |
| Oxygen cycle, interior | 61.9 | 27.8 |

The two default samples were measured to determine the range of values which would occur by analysis of similar samples. Carbon and oxygen appear to be measurable to ±1%. The plasma treated samples all have higher concentration of oxygen and lower concentration of carbon on the surface. The oxygen concentration is higher on the surface of the piece of plasma treated foam 12 than the center, interior. Scanning electron microscope data indicates that the change in wettability is due to chemical change of the surface of the fibers of foam 12, not morphological change.

Experiments were performed using both parallel plate type reactors as well as barrel type reactors. Parallel plate type reactors produce reactive species which interact with foam samples positioned between the plates. In contrast, barrel type reactors include a barrel or faraday cage in which the foam samples are positioned. Reactive species in the barrel type reactors are produced outside of the barrel. The barrel or faraday cage excludes charged reactive species such as ions from interacting with the foam 12 while allowing uncharged reactive species such as free radicals to interact with foam surfaces. Both types of reactors are effective in treating foam 12 to improve wettability using the method of the present invention. Therefore, it is believed that free radical reaction is primarily responsible for improving wettability by interacting with foam surfaces.

Figure 8:
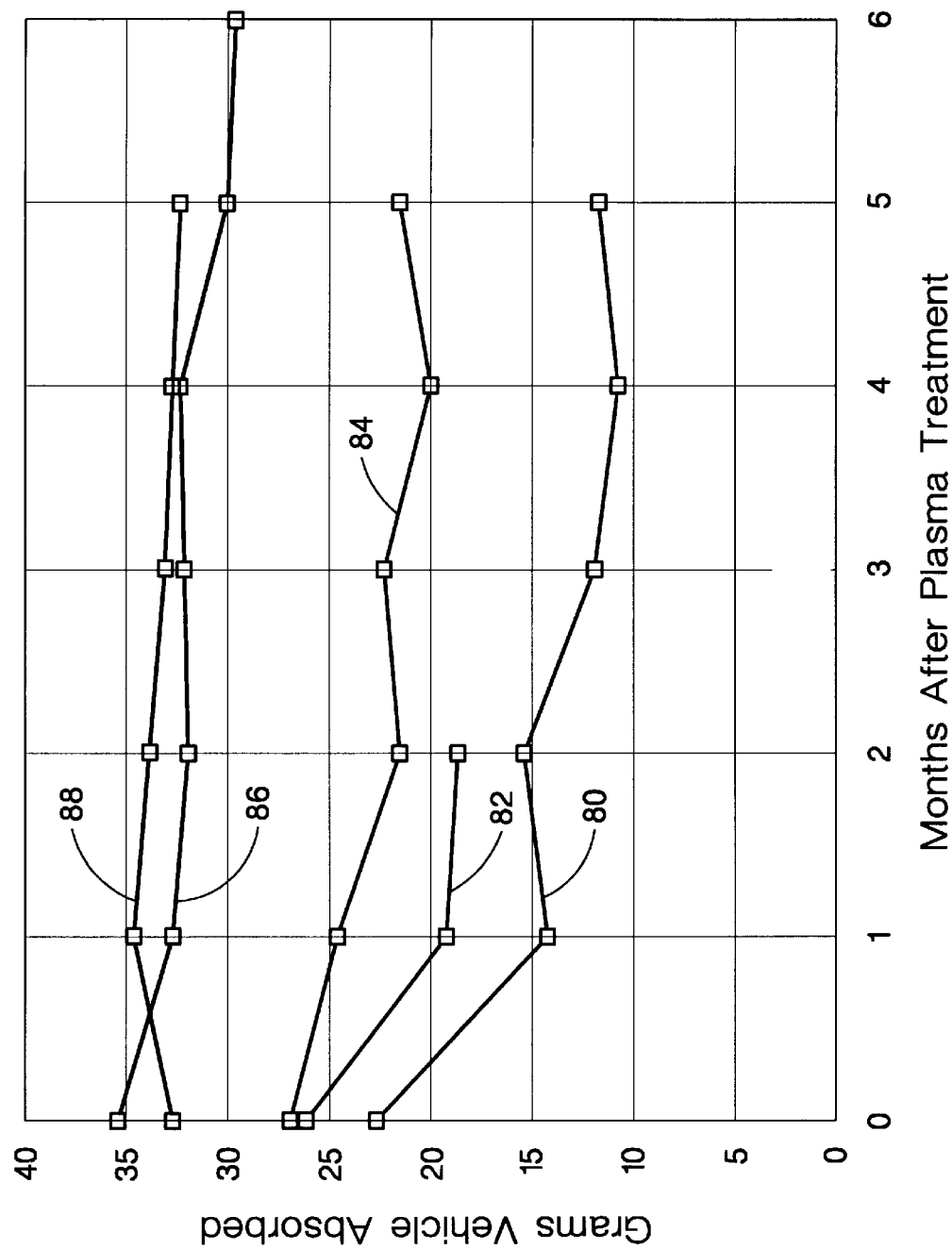
FIG. 8 is a represents the mass of an ink vehicle absorbed versus time of storage for foam samples that were both cleaned and uncleaned prior to plasma treatment.

An investigation was then performed to determine the stability of plasma treatment with storage time. Samples of plasma treated foam 12 were stored in clean polyethylene terephthalate (PET) bags which have been shown not to significantly contaminate plasma treated surfaces. The results are summarized in FIG. 8 which represents mass of vehicle absorbed verses time of storage for a variety of foam samples. Curves 80 and 86 represent an identical lot of foam samples. The samples shown in curve 80 were not cleaned and plasma treated using the method of the present invention. The samples in curve 86 were processed together with those in curve 80 except these samples were acetone cleaned prior to processing. Each data point represents an average from 6 foam samples.

The above experiment was repeated with a second lot of foam samples represented by curves 84 and 88. Curve 84 represents samples which were not cleaned and plasma treated using the method of the present invention. Curve 88 represents samples from the same lot and which were processed together with those in curve 84 except that the samples in curve 88 were cleaned prior to processing with IPA.

A significant reduction in the absorption of vehicle upon the storage of foam 12 is apparent from curves 80 and 84 as compared with corresponding cleaned foam 12 in curves 88 and 86, respectively. It is believed that the reduction of vehicle absorption is due to contaminants on the surface of the foam 12 that are either spreading or reacting with the plasma treated surface. Note that the plasma treated method makes use of repressurization with air which may also have an effect. Curve 82, similar to curves 80 and 84, represents foam samples that were not cleaned and were treated using the plasma treatment method of the present invention.

Curve 88 and 86 represent foam samples which were cleaned and processed using the plasma treatment of the present invention. Curve 86 represents foam 12 which was acetone cleaned and curve 88 represents foam 12 which was IPA cleaned. It can be seen from 86 and 88 that cleaning the foam 12 with either IPA or acetone prior to plasma treatment tends to improve the stability of the plasma treatment with storage time and also significantly increases wettability. The cleaning of foam 12 prior to plasma treatment tends to reduce both the slope of the reduction in storage ability or wettability as well as the overall storage ability or wettability. It is believed that the IPA treatment and the acetone treatment remove contaminants such as oil from the foam surface which prevents the contamination of the plasma surface over time which can degrade the wettability of the foam 12. Applicants believe that cleaning the foam 12 using a variety of cleaners discussed previously with respect to table 4 may be used to not only improve the wettability of foam 12 after plasma treatment, but also, this cleaning process also improves the stability of the plasma treatment over time.

In conclusion, the present invention provides a method for treating foam 12 to enhance the bulk wettability characteristics of the foam 12. The present invention makes use of a plasma surface treatment technique which is performed in a series of treatment cycles. Between each of the plasma treatment cycles the chamber pressure is raised to a pressure greater than 200 torr and then reduced to the plasma treatment pressure to purge reaction products. Purging reaction products improves the effectiveness of the subsequent plasma surface treatment to treat interior surfaces within the foam 12 to increase bulk wettability characteristics. Cleaning the foam 12 prior to plasma treatment improves the wettability of the treated foam 12 and improves the stability of the treated foam 12 over time.

What is claimed is:

1. A method of treating an open cell bulk foam for increasing wettability thereof by controlling specific reaction limiting events, the method comprising steps of:

(1) reacting surfaces of cells of the open cell foam with a reactive specie which interacts with the surfaces of the cells throughout the bulk of the foam to produce a reaction product, the reaction product being produced by free radical oxidation of the open cell foam using the reactive specie from a gas plasma treatment process;

(2) removing at least a portion of the reaction product which is gaseous from the open cell foam by means of an out diffusion process; and (3) repeating the step (1) after the step of removing said at least a portion of the reaction product.

2. The method of claim 1 wherein the plasma treatment process is carried out using a gas containing oxygen.

3. The method of claim 1 wherein treating the open cell foam with the reactive specie is accomplished at a first pressure by diffusion of a gas into the open cell foam, then removing the reaction products is accomplished at a second pressure less than the first pressure.

4. The method of claim 1 wherein the open cell foam is a polymer foam.

5. The method of claim 1 further including inserting the open cell foam into an ink storage device for use in an ink based printing system after the step (3).

6. The method of claim 1 wherein the step (3) further includes repeating the step (2).

7. The method of claim 1 wherein the step (3) further includes repeating the steps (1) and (2) at least twice.

8. The method of claim 1 further including cleaning the open cell foam to remove contaminants prior to treating the open cell foam with the reactive specie.

9. A method for increasing coverage of a chemically active surface treatment for an open cell bulk polymer foam, the bulk polymer foam having a peripheral portion and an interior portion, the method comprising:

diffusing a chemically active species into the interior portion of the bulk polymer foam by increasing pressure in a region surrounding the polymer foam, the chemically active species being diffused into the bulk polymer foam by a gas plasma treatment process;

reacting the chemically active species with surfaces of cells of the bulk polymer foam to produce reaction products, the reaction products being produced by free radical oxidation of the open cell bulk polymer foam using the reactive species from the gas plasma treatment process; and further including first removing at least a portion of the reaction products which are gaseous; and thereafter diffusing additional chemically active pieces into the polymer foam which interact with surfaces of cells of the bulk polymer foam to produce additional reaction products.

10. The method of claim 9 wherein the polymer foam is a polyurethane foam.

11. The method of claim 9 further including inserting the polymer foam into an ink container configured for providing ink to an ink jet printhead after the additional reaction products are produced.

12. A method of treating a bulk polymer foam for increasing wettability comprising:

first cleaning the polymer foam to remove contaminants;

thereafter oxidizing the polymer foam using a gas plasma treatment process at a first pressure, thereby producing reaction products;

removing at least a portion of these reaction products which are gaseous formed during the gas plasma treatment process at a second, relatively lower pressure; and then oxidizing the polymer foam using a second gas plasma treatment process.

13. The method of treating polymer foam of claim 12 wherein cleaning the polymer foam is performed using a cleaner selected from the group consisting of hydrocarbons and liquid carbon dioxide.

14. The method of claim 12 wherein cleaning the polymer foam is performed using a cleaner selected from the group consisting of ketones, alcohols, ethers and acids.

15. The method of claim 12 wherein cleaning the polymer foam is performed using a heterocyclic solvent.

* * * * *